United States Patent
Langen

(10) Patent No.: US 9,704,064 B2
(45) Date of Patent: Jul. 11, 2017

(54) AUTOMATIC ACCESS CONTROL SYSTEM FOR CONTROLLING ACCESS TO A PHYSICAL OBJECT OR ADMISSION TO A PHYSICAL OBJECT AND METHOD

(71) Applicant: Siemens Aktiengesellschaft, Munich (DE)

(72) Inventor: Manfred Langen, Munich (DE)

(73) Assignee: SIEMENS AKTIEGESELLSCHAFT, Munich (DE)

( * ) Notice: Subject to any disclaimer, the term of this patent is extended or adjusted under 35 U.S.C. 154(b) by 500 days.

(21) Appl. No.: 13/786,592

(22) Filed: Mar. 6, 2013

(65) Prior Publication Data

US 2013/0243265 A1  Sep. 19, 2013

(30) Foreign Application Priority Data

Mar. 15, 2012  (DE) .................. 10 2012 204 064

(51) Int. Cl.

| | |
|---|---|
| G06K 9/62 | (2006.01) |
| G06F 21/30 | (2013.01) |
| G06F 21/31 | (2013.01) |
| G06F 21/44 | (2013.01) |
| H04W 12/08 | (2009.01) |
| H04W 84/12 | (2009.01) |

(52) U.S. Cl.
CPC ........... G06K 9/6215 (2013.01); G06F 21/30 (2013.01); G06F 21/31 (2013.01); G06F 21/44 (2013.01); H04W 12/08 (2013.01); H04W 84/12 (2013.01)

(58) Field of Classification Search
CPC ....... G06K 9/6215; G06F 21/30; G06F 21/31; G06F 21/44; H04W 12/08; H04W 84/12
USPC ........................................ 340/5.27
See application file for complete search history.

(56) References Cited

U.S. PATENT DOCUMENTS

| | | | |
|---|---|---|---|
| 2007/0270128 A1* | 11/2007 | Kakiuchi | 455/411 |
| 2010/0102929 A1* | 4/2010 | Haumann | 340/5.81 |
| 2010/0227587 A1* | 9/2010 | Ohmoto | 455/411 |
| 2010/0299717 A1* | 11/2010 | Nasirifard et al. | 726/1 |
| 2012/0030734 A1* | 2/2012 | Wohlert | 726/4 |
| 2012/0159579 A1* | 6/2012 | Pineau | G07C 9/00166 726/4 |

OTHER PUBLICATIONS

German Office Action, Application No. 102012204064.1, 7 pages, Sep. 29, 2015.

* cited by examiner

*Primary Examiner* — Edwin Holloway, III
(74) *Attorney, Agent, or Firm* — Slayden Grubert Beard PLLC

(57) ABSTRACT

An automatic access control system for controlling access to a physical object or admission to a physical object with an identification mechanism is configured to identify a person and/or a device and with a release mechanism, which is configured to grant the identified person and/or the identified device access to the physical object or admission to the physical object when an automatically calculated distance metric of the identified person and/or of the identified device to the physical object is smaller than a prespecified threshold value for the distance metric.

6 Claims, 2 Drawing Sheets

AUTOMATIC ACCESS CONTROL SYSTEM FOR CONTROLLING ACCESS TO A PHYSICAL OBJECT OR ADMISSION TO A PHYSICAL OBJECT AND METHOD

CROSS-REFERENCE TO RELATED APPLICATIONS

This application claims priority to DE Patent Application No. 10 2012 204 064.1 filed Mar. 15, 2012. The contents of which is incorporated herein by reference in its entirety.

TECHNICAL FIELD

The present disclosure relates to an automatic access control system for controlling access to a physical object or admission to a physical object. The present disclosure also relates to a corresponding method.

BACKGROUND

Access control systems are used to monitor access or admission to certain objects. In this context, an access control system is used to decide whether, for example, a person is granted access to a certain object.

In this context, access control systems can be used to control access to both physical objects and virtual objects, for example data.

In usual access control systems, people or key objects in the possession of the respective person are identified directly or indirectly and the authorization of the respective person to access the object determined. To determine this authorization, authorization data are specified for each person and used by the access control system. The authorization data show for each person whether or not a person may access the respective object.

In this context, the authorization data can also contain further information. For example, authorization for a person to access an object can be dependent on the time of day or the day of the week. For example, an employee can be granted admission to a development laboratory only on working days between 7:00 and 19:00.

The authorization data can also, for example, contain information on the type of authorization for a person. In a library, for example, a person may have the right to enter the reading room, but no right to borrow books. Similarly, a warehouse worker can have the right to enter the warehouse for purposes of his work, but only the delivery driver will have the right to remove objects from the warehouse.

To be able to use a conventional access control system, it is necessary to define the authorization to access an object for each user individually or at least for a group of users prior to the access of a user to the object and make this information available to the access control system.

The result of this is that an access control system can only be adapted to match a changing number of users with great effort.

SUMMARY

One embodiment provides an automatic access control system for controlling access to a physical object or admission to a physical object, the automatic access control system comprising: an identification mechanism, which is embodied to identify a person and/or a device; and a release mechanism configured to grant the identified person and/or the identified device access to the physical object or admission to the physical object when an automatically calculated distance metric of the identified person and/or of the identified device to the physical object is smaller than a prespecified threshold value for the distance metric.

In a further embodiment, the automatic access control system further comprises a computing mechanism configured to automatically calculate the distance metric of the identified person and/or of the identified device to the physical object.

In a further embodiment, the computing mechanism is embodied automatically to calculate the distance metric at least based on potential relationships of the identified person and/or of the identified device to the physical object which from semantic dimensions, which refer to identified person and/or the identified device and/or to interactions of the identified person and/or of the identified device with the physical object, and/or based on explicit relationships of the identified person and/or of the identified device to the physical object.

In a further embodiment, the computing mechanism is embodied as a server and the server is coupled to the release mechanism via a private and/or public data network.

In a further embodiment, the release mechanism is embodied to retrieve the distance metric of the identified person and/or of the identified device to the physical object via a protocol for interprocess communication, in particular RPC, and/or via an application interface, in particular a REST application interface and/or a SOAP application interface of the computing mechanism.

In a further embodiment, the identification mechanism is embodied as an optical identification mechanism and/or a contact-based electronic identification mechanism and/or a contactless electronic identification mechanism and/or a biometric identification mechanism.

In a further embodiment, the physical object is embodied as a WLAN router and the release mechanism is embodied to grant an identified WLAN device access to the WLAN-router.

In a further embodiment, the physical object comprises an electronic door lock and the release mechanism is embodied to grant an identified person access to the physical object protected by the electronic door lock or admission to the physical object protected by the electronic door lock.

In a further embodiment, the physical object is embodied as a security airlock and the release mechanism is embodied to grant an identified person admission to at least one area protected by the security airlock.

In a further embodiment, the physical object is embodied as a location with a plurality of areas and the release mechanism is embodied to give an identified person and/or an identified device a reference to at least one of the areas.

Another embodiment provides a method for access control to a physical object comprising: identification of a person and/or a device; and release of the access to the physical object or admission to the physical object for the identified person and/or the identified device when a distance metric of the identified person and/or of the identified device to the physical object is smaller than a prespecified threshold value for the distance metric.

In a further embodiment, the distance metric of the identified person and/or of the identified device to the physical object is calculated at least on the basis of potential relationships of the identified person and/or of the identified device to the physical object which from semantic dimensions, refer to the identified person and/or the identified device and/or of interactions of the identified person and/or of the identified device with the physical object, and/or on the basis of explicit relationships of the identified person and/or of the identified device to the physical object.

In a further embodiment, the distance metric the identified person and/or of the identified device to the physical object is retrieved via a protocol to the interprocess communication, in particular RPC, and/or via an application interface, in particular a REST application interface and/or a SOAP application interface from a computing mechanism.

In a further embodiment, the person and/or the device is identified with an optical identification mechanism and/or a contact-based electronic identification mechanism and/or a contactless electronic identification mechanism and/or a biometric identification mechanism.

In a further embodiment, on the release of the access or admission an identified WLAN device is granted access to a WLAN router; and/or an identified person is granted access to the physical object protected by an electronic door lock or admission to the physical object protected by the electronic door lock; and/or an identified person is granted admission to at least one area protected by a security airlock; and/or at least one local area relevant to the identified person and/or the identified device is output to an identified person and/or an identified device.

BRIEF DESCRIPTION OF THE DRAWINGS

Exemplary embodiments will be explained in more detail below on the basis of the schematic drawings, wherein.

DETAILED DESCRIPTION

Figure 1:
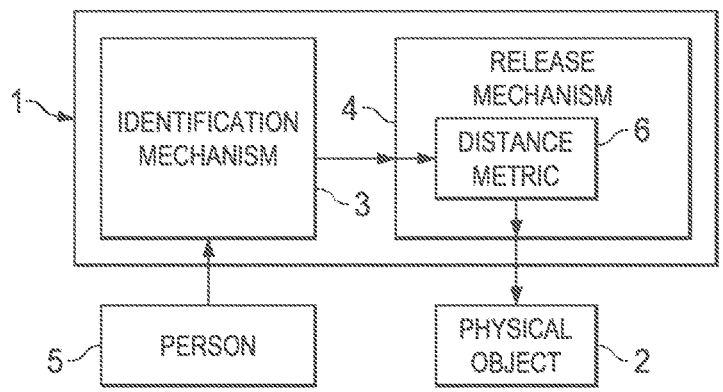
FIG. 1 a block diagram of an example embodiment of an automatic access control system.

Embodiments of the present disclosure provide a flexible access control system.

For example, some embodiment provide:

An automatic access control system for controlling access to a physical object or admission to a physical object with a identification mechanism, which is embodied to identify a person and/or a device and with a release mechanism, which is embodied to grant the identified person and/or the identified device access to the physical object or admission to the physical object when an automatically calculated distance metric of the identified person and/or of the identified device to the physical object is smaller than a prespecified threshold value for the distance metric.

Other Embodiments Provide

A method for controlling access to a physical object with the steps: identification of a person and/or of a device and release of access to the physical object or admission to the physical object for the identified person and/or the identified device when a distance metric of the identified person and/or of the identified device to the physical object is smaller than a prespecified threshold value for the distance metric.

The knowledge on which the present invention is based consists in the fact that nowadays access control or also admission control usually has to be statically configured and this static configuration results in a high degree of effort when handling the access control system. In particular, this has the result that, on changes to the users, for example the addition of a new user, the access control system has to be manually adapted.

Thus, some embodiments provide an access control system with which the control of the access or admission for users is not performed on the basis of a static configuration of the access control system.

Some embodiments provide automatic control of access to a physical object or admission to the physical object on the basis of a dynamic, variable distance metric.

In this context, some embodiments are based on the assumption that potential users of an access control system actively or passively publish a wide range of information, which enables a distance metric between the respective users and a description provided for the physical object in question to be determined.

When a distance metric of this kind between the corresponding physical object and a user is determined, it can be very simply controlled on the basis of a prespecified threshold value for the respective distance metric whether the user is given admission to the physical object or access to the physical object. For example, it can be provided that a user is allowed to enter a building when the distance metric determined between the user and the building fall below the prespecified threshold value.

In this context, a value for the distance metric of 0 means the greatest "proximity". In one embodiment, the distance metric can also be standardized to a value of 1, which then means the greatest "proximity".

Here, the present invention is not restricted to people but can also control the access of a device to a physical object.

Advantageous embodiments and developments may be derived from the subclaims and from the description with reference to the figures.

In one embodiment, a computing mechanism is provided, which is embodied automatically to calculate the distance metric of the identified person and/or of the identified device to the physical object. This enables a very simple control of the access to a physical object or admission to a physical object.

In particular, access control based on up-to-date data can take place automatically without the involvement of an administrator, for example.

In one embodiment, the computing mechanism is embodied automatically to determine the distance metric at least on the basis of potential relationships of the identified person and/or of the identified device to the physical object, which from semantic dimensions, which relate to the identified person and/or the identified device and/or to interactions of the identified person and/or of the identified device with the physical object, and/or on the basis of explicit relationships of the identified person and/or of the identified device to the physical object.

In this context, semantic dimensions can, for example, relate to information or terms or subjects which the identified person have themselves published. These can, for example, be contributions in a forum, blog entries or articles written by the identified person. A semantic dimension can, for example, be formed on the basis of terms or tags, which were extracted from the publications of the identified person and from tags or terms relating to the physical object For example, the Hamming distance can be used as a semantic dimension. Further possibilities are feasible.

Interactions of the identified person and/or of the identified device with the physical object can also, for example, be interactions of the identified person and/or of the identified device with a description of the physical object or with information published on the physical object or the like. For example, an identified person can write a report on a physical object or comment on a report on a physical object.

Finally, explicit relationships of the identified person and/or of the identified device to the physical object can, for example, be status information in a social network, such as, for example, a "friend" status or the like.

In one embodiment, the computing mechanism is embodied as a server and the server is coupled to the release mechanism via a private and/or public data network. This makes it possible, to provide a decentralized access control system with which a computing mechanism can be coupled to a plurality of release mechanisms.

In one embodiment, the release mechanism is embodied to retrieve the distance metric of the identified person and/or of the identified device to the physical object from the computing mechanism via a protocol for interprocess communication, in particular RPC, and/or via an application interface, in particular a REST application interface and/or a SOAP application interface. This makes it possible to use a standardized interface. This makes it possible also to make access to the distance metric available to further systems and applications.

In one embodiment, the identification mechanism is embodied as an optical identification mechanism and/or a contact-based electronic identification mechanism and/or a contactless electronic identification mechanism and/or a biometric identification mechanism. This makes it possible to adapt the identification mechanism very flexibly to different requirements and applications.

In one embodiment, the physical object is embodied as a WLAN router and the release mechanism is embodied to grant an identified WLAN device access to the WLAN router. This makes it possible, for example, to provide a public WLAN admission point without each user having explicitly to register in order to use the WLAN admission point.

In one embodiment, the physical object has an electronic door lock and the release mechanism is embodied to grant an identified person access to the physical object protected by the electronic door lock or admission to the physical object protected by the electronic door lock. This enables very flexible control of the access or admission to the physical object.

In one embodiment, the physical object is embodied as a security airlock and the release mechanism is embodied to grant an identified person admission to at least one area protected by the security airlock. In this context, the security airlock can provide different security levels and the access control system can assign each user one of the security levels. In this context, each security level provides different security checks. This makes it possible to increase the security for the physical object, for example an airport, and however, in this context, simultaneously reduce the waiting time at the security airlock for users classed as potentially harmless.

In one embodiment, the physical object is embodied as a place with a plurality of areas and the release mechanism is embodied to provide an identified person and/or an identified device a reference to at least one of the areas. This makes it possible to show a user, for example in a waiting area of an airport or railroad station, an area in which people with the same or similar interests are located.

Where appropriate, the above embodiments and developments can be combined with each other in any way desired. Further possible embodiments, developments and implementations of the invention also include combinations that are not explicitly named of features of the invention described above or below with respect to the exemplary embodiments. In particular, in this context, the person skilled in the will also add individual aspects as improvements or supplements to the respective basic form of the present invention.

FIG. 1 shows a block diagram of an embodiment of an example automatic access control system 1.

The automatic access control system 1 has an identification mechanism 3, which is embodied to identify a person 5. The identification mechanism 3 is coupled to a release mechanism 4, which is embodied to grant the identified person 5 access to a physical object 2 on the basis of an automatically calculated distance metric 6. To this end, the release mechanism 4 compares the automatically calculated distance metric 6 with a prespecified threshold value for the distance metric 6. If the automatically calculated distance metric 6 is smaller than the prespecified threshold value, access to the object 2 is released by the release mechanism 4.

The automatic access control system 1 in FIG. 1 is an automatic access control system 1 for controlling admission to a room 2. To this end, the identification mechanism 3 is embodied as an RFID reader 3, which identifies people 5 with reference to a RFID tag, which they can wear, for example in the form of a pass. If a person 5 is identified, information on the identified person 5 is sent from the identification mechanism 3 to the release mechanism 4. The release mechanism 4 is embodied as a door control mechanism 4, which is embodied to open and close a door. The door control mechanism 4 is also embodied, on the basis of the information on the identified person 5 and an automatically calculated distance metric 6, to grant or not to grant the identified person 5 entry to the room 2 protected by the door. The room 2 protected by the door can, for example, be a conference room 2.

In order to be able automatically to calculate a distance metric 6, at least one description of the conference taking place in the conference room 2 is provided. In addition, publications published by the identified person 5 will be checked with respect to their semantic similarity to the description of the conference. The similarity of the corresponding publications to the description the conference can be expressed as a semantic dimension. To this end, the cosine distances of term vectors can be calculated, for example, for terms from the description the conference and from the publications of the identified person 5.

In one embodiment, this semantic dimension is used as a distance metric 6 for controlling admission of the corresponding identified person 5 to the conference room 2.

In further embodiments, further identifying numbers are included in the calculation of the distance metric 6.

For example, a status of the identified person, which the identified person has published in a social network, for example Facebook, Google+ or the like, in relation to the conference can be incorporated in the calculation of the distance metric. For example a person can be a "friend", a "follower" or the like of the conference. In this context, each of these statuses can be assigned a weighting. For example, a friend status can be given a weighting of 0.8 and a follower status a weighting of 0.4. Different weightings can be defined according to the application.

A distance metric 6 can then, for example, be calculated from a linear, in particular a weighted, linking of the semantic dimension and the weighting of the status of the identified person 5.

Further possibilities for forming the distance metric 6 will be described in more detail with reference to FIG. 4.

The automatic access control system 1 in FIG. 1 controls admission to a conference room 2. In further embodiments, the access control system 1 can also control admission to waiting areas 2, for example in airports or railroad stations.

In still further embodiments, however, the access control system 1 can also control admission to servers 2, internet pages 2, data 2 and the like. In this context, different identification procedures can be used to identify the respective users 5. For example, an identifier and a password can be used to identify a user 5. In addition, it is also possible for smartcard-based identification procedures or the like to be used.

In such embodiments, the access control system 1 can also be embodied as a general access control system 1, which controls not only access to an individual server 2 or an individual internet page 2, but also offers a service over a network, which can be used by a plurality of servers 2, internet pages 2 and the like.

The access control system 1 can, for example, also be used to control access to a wireless network 2, for example a WLAN 2. In an embodiment of this kind, the identification mechanism 3 can be arranged in a WLAN admission point 3. This is in particular of advantage since WLAN admission points 3 already implement the identification of WLAN devices 5 according to the WLAN standard. The release mechanism 4 can, for example, be embodied as a network server 4, which is coupled via a local and/or public network to the WLAN admission point 3.

In still further embodiments, the access control system 1 can, for example, also control admission to a time-shared physical object 2, such as for example a hire bicycle 2 or a car-share vehicle 2. The access control system 1 could, for example, be coupled to a door lock of a car-share vehicle 2 and control the opening and closing of the door lock of the car-share vehicle 2.

In an application of this kind, the automatic calculation of the distance metric 6 can use different information from that used for admission control for a conference. For example, a dimension can be defined which enables a statement to be made regarding how many existing users of the car-share vehicle know a new identified user 5, who wishes to be given admission to the car-share vehicle. In addition, the automatic calculation of the distance metric 6 can also include information on the credit status of the identified user 5, for example a report from the Schufa credit rating agency, information on the behavior of the identified user 5 with respect to other providers of rental and/or hire objects and the like. For example, a database with information on the behavior of users 5 with rental DVDs, rental CDs, loan books and the like can be established. If, for example, a user has returned loan books in a poor condition or too late, this can result in a high value of the distance metric on future enquiries.

Figure 2:
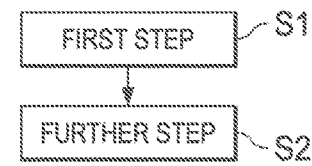
FIG. 2 a flow diagram of an example embodiment of a method.

FIG. 2 shows a flow diagram of an embodiment of an example method.

In a first step S1, a person 5 and/or a device 5 is identified. A person can for example also be identified with reference to a device, for example a smartcard, in combination with a further feature, for example a PIN.

In a further step S2, the access to the physical object 2 or admission to the physical object 2 for the identified person 5 and/or the identified device 5 is released when a distance metric 6 of the identified person 5 and/or of the identified device 5 to the physical object 2 is smaller than a prespecified threshold value for the distance metric 6.

Figure 3:
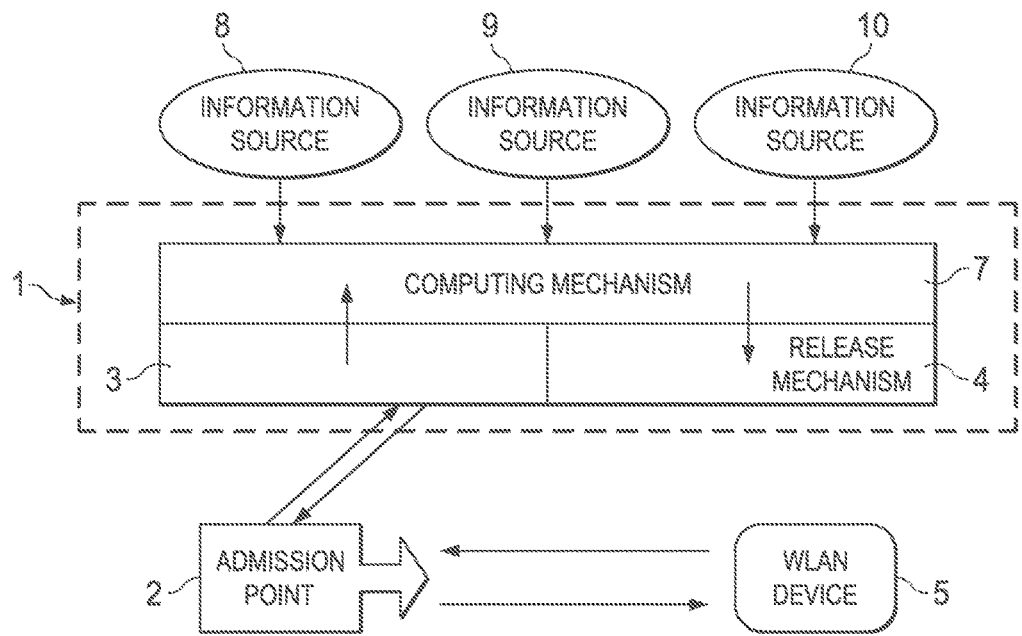
FIG. 3 a further block diagram of an example embodiment of an automatic access control system.

FIG. 3 is another block diagram of an embodiment of an example automatic access control system 1.

The access control system 1 in FIG. 3 differs from the access control system 1 in FIG. 1 to the extent that the physical object 2 for which admission is controlled is a WLAN admission point 2. The access control system 1 in FIG. 3 also has a computing mechanism 7, which is embodied automatically to calculate a distance metric to an identified WLAN device 5 with respect to the WLAN admission point 2 and provide this to the release mechanism 4.

FIG. 3 also shows three information sources 8, 9 and 10 in the form of ellipses 8, 9 and 10, which contain information from at least one social network 8, information on publications 9 of a person, who is assigned to the WLAN device 5, and information on interactions of the person, who is assigned to the WLAN device 5, with for example an operator of the WLAN admission point 2.

In further embodiments, the information sources 8, 9 and 10 can, for example, each relate to a specific social network. For example, the information source 8 can relate to public social networks. The information source 9 can relate to closed social networks (for example a company intranet). Finally, the information source 10 can relate to temporary social networks (for example conferences). Further embodiments of the information sources are also possible.

Figure 4:
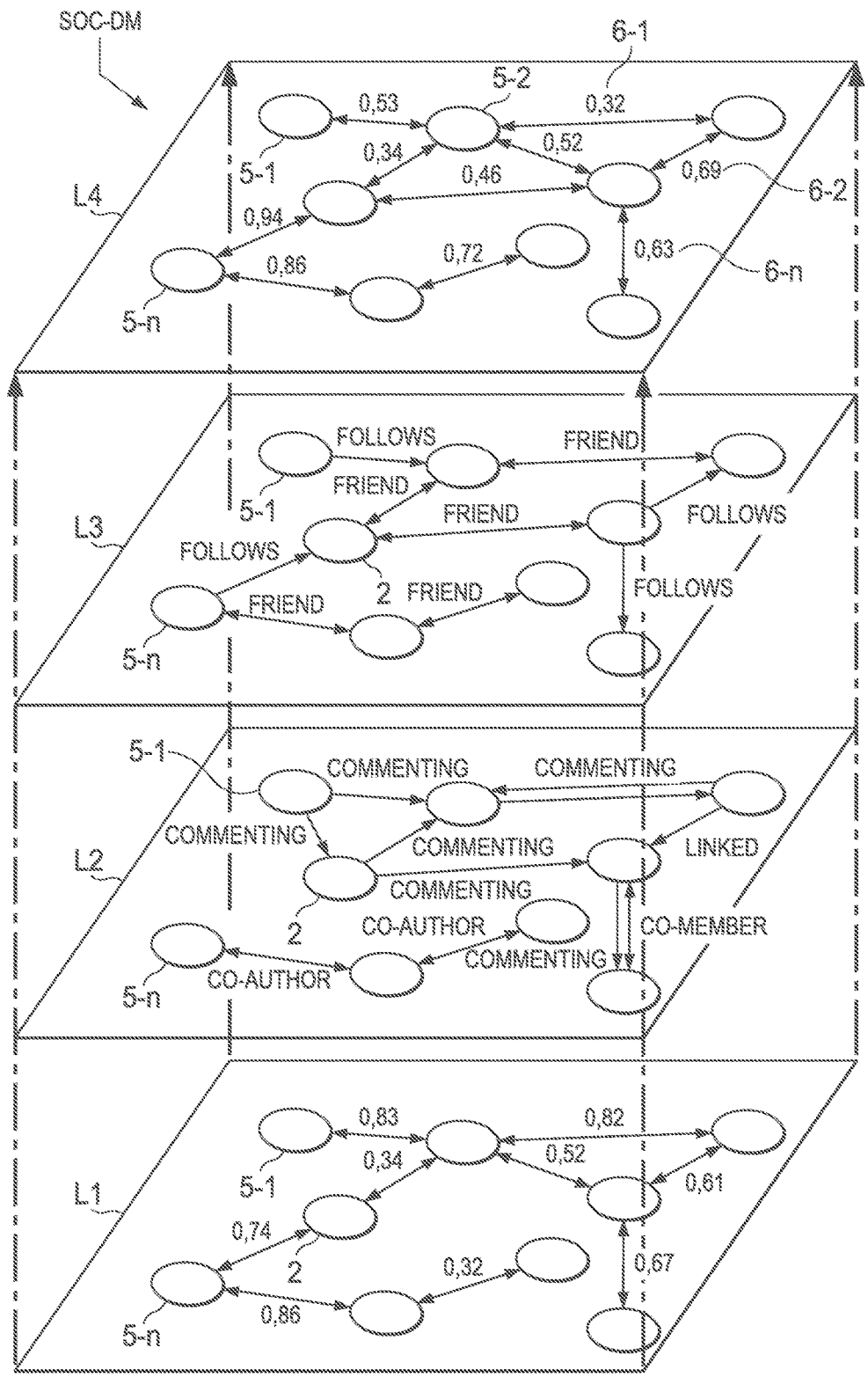
FIG. 4 a diagram illustrating an example distance metric.

FIG. 4 is a diagram illustrating the distance metric 6.

FIG. 4 shows a multi-layer network 11 of relationships. The multi-layer network 11 in FIG. 4 has four layers L1-L4. In this context, each of the layers has information on a plurality of users 5-1-5-*n* or devices 5-1-5-*n*, which can use the access control system 1. In this context, each layer relates to another type of relationship between the users 5-1-5-*n* or devices 5-1-5-*n* and the physical object 2 protected by the access control system 1.

The layer L1 has semantic dimensions, which identify relationships between individual users 5-1-5-*n* or devices 5-1-5-*n* and in relation to the physical object 2. This makes it possible also to calculate a semantic dimension for the users 5-1-5-*n* or devices 5-1-5-*n*, which do not have a direct connection to the physical object 2. For example, the semantic dimensions of the connections between a user 5-1-5-*n* or device 5-1-5-*n*, which lie between this user 5-1-5-*n* or device 5-1-5-*n* and the physical object 2, can be totaled up.

The second layer L2 has information, which can be derived from interactions between individual users 5-1-5-*n* or devices 5-1-5-*n* between each other and in relation to the physical object 2. For example, a user 5-1-5-*n* can make a comment about a conference or a user 5-1-5-*n* can be the co-author of a report about the conference. Each of these interactions can be assigned a specific weight. For example, instead of terms such as, for example, "co-author", "comments" and the like, dimensions can be specified with which further calculations are possible very simply.

The third layer L3 has information, which is derived from actions or statuses, for example passive and/or unilateral actions, between individual users 5-1-5-*n* or devices 5-1-5-*n* with each other and in relation to the physical object 2. These actions and/or statuses can, for example, be derived from a social network. For example, the status between a user 5-1-5-*n* and a conference, which the user has published in a social network, can be, for example, "follower" and the like. Dimensions can also be assigned to the individual statuses. For example, instead of the terms such as "follower", "friend" and the like, dimensions can be specified with which very further calculations are possible very simply.

The automatic calculation of the distance metric 6, which is shown in the fourth layer L4, can take place in different ways. In particular, a plurality of distance metrics 6 can be calculated from one and the same multi-layer network 11.

For the calculation of the distance metrics, it is, for example, possible for a weight in form of a factor between 0 and 1 to be defined for each layer L1-L3 of the first to third layers L1-L3. The distance metric 6 can then be calculated, for example as the sum of the weighted dimensions of the first to third layers L1-L3.

The weighting of the individual dimensions of the first to third layers L1-L3 makes it possible to define specific distance metrics for specific questions. It is, for example, possible to eliminate the influence of a dimension in that a factor of 0 is specified for this dimension. It is moreover possible to define the distance metric as only one of the dimensions in that the other dimensions are weighted with a factor von 0.

In a further embodiment, the individual dimensions of the first to third layers L1-L3 can also be added and/or subtracted. In addition, the individual dimensions of the first to third layers L1-L3 can be multiplied or divided. Further mathematical calculations are also possible.

In one embodiment, the distance metric is standardized to a maximum value of 1.

In one exemplary embodiment, the admission of a first user 5-1-5-*n* to a forum in a social network can, for example, be controlled by means of the distance metric 6. To this end, the relationships of the first user 5-1-5-*n* to a second user 5-*n*-5-1 already admitted to the forum can be used as a basis. In this example, each layer L1-L3 is weighted with a factor of 1. The distance metric 6 is obtained from the sum of the dimensions of the individual layers L1-L3 divided by the number of dimensions, that is 3.

If the semantic dimension of the first layer L1 has a value of 0.83 and the dimension of the second layer L2 a value of 0.4 and the dimension of the third layer L3 a value of 0, the distance metric 6 is equal to (0.83+0.4+0)/3=0.41.

If, in this case, the threshold value is set at a value greater than 0.41, the first user 5-1-5-*n* is given access to the forum. If the threshold value is set at a value smaller 0.41, the first user 5-1-5-*n* is not given access to the forum.

Although the present invention was described above with reference to certain example embodiments, it is not restricted thereto but may be modified in numerous ways. In particular, the invention can be modified in numerous ways without departing from the core of the invention.

What is claimed is:

1. An automatic access control system for controlling access to a conference, the automatic access control system comprising:
   an identification mechanism configured to identify a person;
   a release mechanism configured to grant the identified person access to the conference in response to a determination that an automatically calculated distance metric relating to a distance of the identified person from a written description of the conference is smaller than a prespecified threshold value for the distance metric;
   wherein the distance metric relating to the distance of the identified person from the written description of the conference is automatically calculated by:
   accessing the written description of the conference;
   accessing content of one or more publications authored by the identified person;
   determining a semantic dimension indicating a semantic similarity between the content of one or more publications authored by the identified person and the written description of the conference; and
   determining the distance metric as the determined semantic dimension or based on the determined semantic dimension.

2. The automatic access control system of claim 1, comprising a computing mechanism configured to automatically calculate the distance metric.

3. The automatic access control system of claim 1, wherein the computing mechanism comprises a server coupled to the release mechanism via at least one of a private network and a public data network.

4. The automatic access control system of claim 1, wherein the release mechanism is configured to retrieve the distance metric of the identified person to the description of the conference via at least one of a protocol for interprocess communication, an application interface, and a SOAP application interface of the computing mechanism.

5. The automatic access control system of claim 1, wherein the identification mechanism comprises at least one of an optical identification mechanism, a contact-based electronic identification mechanism, a contactless electronic identification mechanism, and a biometric identification mechanism.

6. An automatic access control system for controlling access to a conference, the automatic access control system comprising:
   an identification mechanism configured to identify a person;
   a release mechanism configured to grant the identified person access to the conference in response to a determination that an automatically calculated distance metric relating to a distance of the identified person from a conference is smaller than a threshold value for the distance metric;
   wherein the distance metric relating to the distance of the identified person from the conference is automatically calculated by:
   accessing a written description of the conference;
   accessing content of one or more publications authored by the identified person;
   determining a semantic similarity between the content of one or more publications authored by the identified person and the written description of the conference;
   determining a published status of the identified person in a social network in relation to the conference; and
   determining the distance metric based at least on (a) the determined semantic similarity between the content of one or more publications authored by the identified person and the written description of the conference, and (b) the published status of the identified person in the social network in relation to the conference.

* * * * *